M. H. LOUGHRIDGE.
OPERATING ELECTRIC CIRCUITS.
APPLICATION FILED DEC. 3, 1913.

1,197,379. Patented Sept. 5, 1916.

Witnesses:
W. J. Eccles
Lillie E. Loughridge

Inventor:
Matthew H. Loughridge

UNITED STATES PATENT OFFICE.

MATTHEW H. LOUGHRIDGE, OF WOODCLIFF-ON-HUDSON, NEW JERSEY.

OPERATING ELECTRIC CIRCUITS.

1,197,379. Specification of Letters Patent. Patented Sept. 5, 1916.

Application filed December 3, 1913. Serial No. 804,372.

*To all whom it may concern:*

Be it known that I, MATTHEW H. LOUGH-RIDGE, a citizen of the United States, residing at Woodcliff-on-Hudson, in the county of Hudson and State of New Jersey, have invented a new and useful Improvement in Operating Electric Circuits, of which the following is a specification.

My invention relates to improvements in electric circuits as used in fire alarms, railway signal systems, etc., and has for an object to secure greater safety in circuits of this kind so that broken wires, grounds, or crosses with other wires will not cause a false signal, and a further object of my invention is to prevent the improper operation of a remote controlled circuit when energized from any source other than its normal supply.

With these objects in view this invention consists in establishing on a main circuit a superposed circuit having an electro-active device connecting to an intermediate point in the source of energy. This superposed circuit remains inactive when a definite relation is maintained between the currents in each conductor of the main circuit. This condition establishes the operating condition or condition of safety. On the other hand, when this definite relation between these currents is not maintained, the operating conditions cannot be established.

For descriptive purposes I will call the responsive electric device that is normally energized, the "current relay" or "relays" as the case may be; the wires comprising its circuit, the "current wires;" and the normally deënergized electro-active device, I will refer to as the "potential relay," and the wire composing its circuit as the "potential wire."

Figure 1:
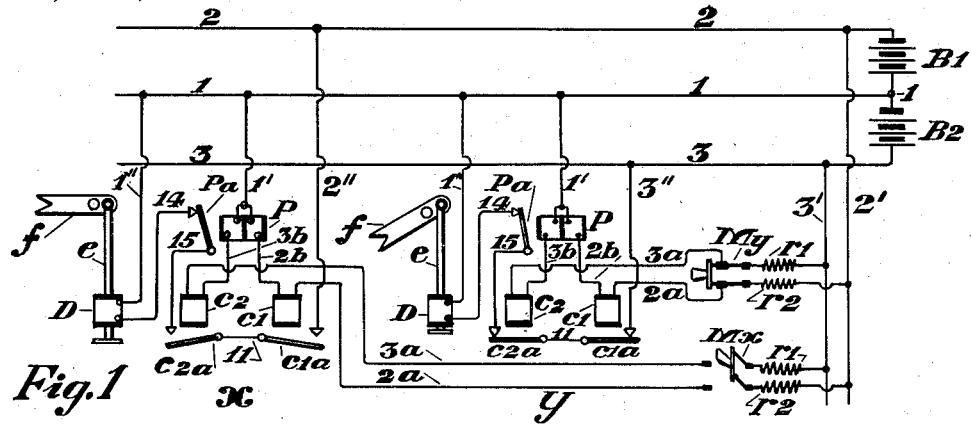
Figure 2:
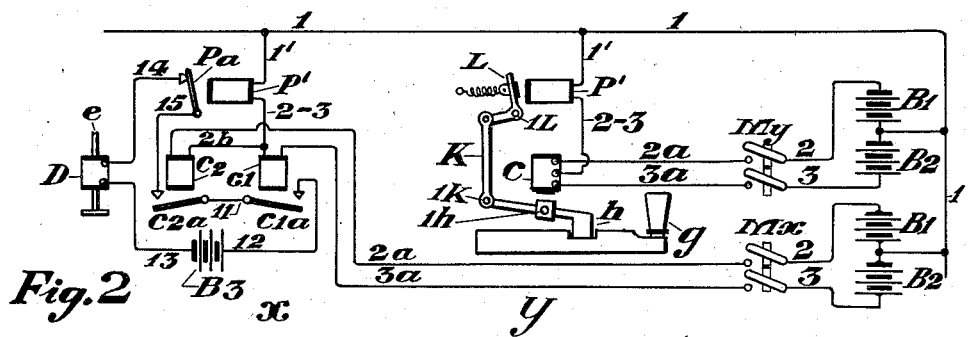
Figure 3:
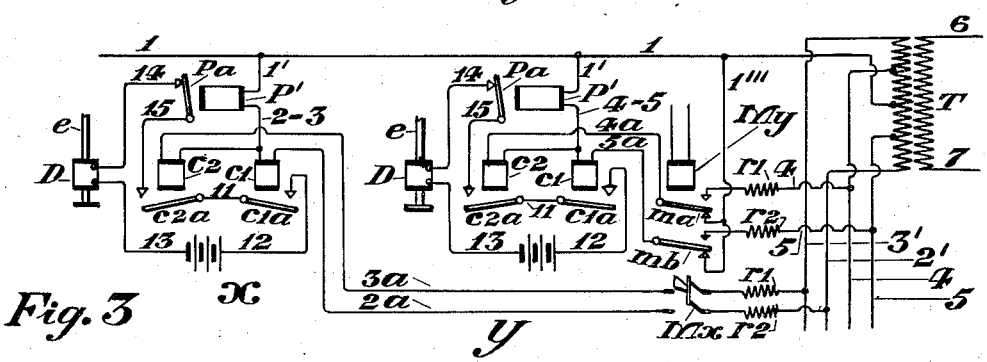
Figure 4:
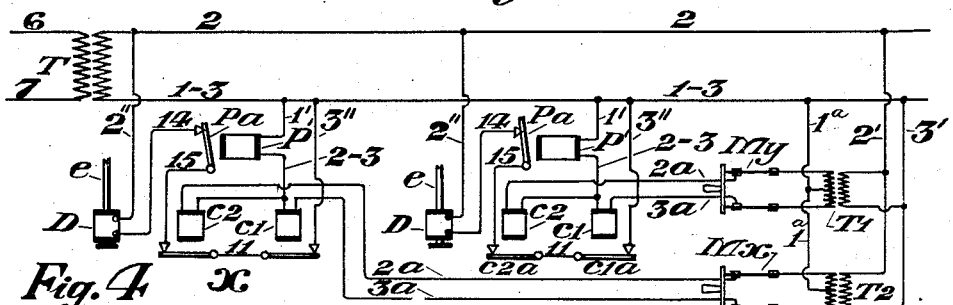

*Drawings.*—Figure 1 shows the application of the invention to a three wire system using a central source of direct current energy; Fig. 2 is a modification using an individual source of direct current energy for each circuit; Fig. 3 shows an application of a central source of alternating current energy used at different voltages on the controlling circuits; Fig. 4 is an alternating current application of individual energy analogous to Fig. 2, modified, however, to show the combination of the transmission line and potential wire.

I have illustrated my invention principally in connection with railway signaling systems, which, as usually applied requires the presence of current in a closed circuit to establish the conditions of safety against the usual bias of the apparatus. It is understood, however, that my invention may be applied to other purposes.

Referring to Fig. 1, B1 and B2 designate a source of energy in a direct current battery having a transmission wire 2 connected to one terminal and the transmission wire 3 connected to the other terminal and the neutral or potential wire 1 connected to the central point between batteries B1 and B2. C1 and C2 are the current relays whose control circuit may be followed from wire 2', resistance $r2$, controller M$y$, wire 2$a$, to relay C1, wire 2$b$ to potential relay P, wire 3$b$ to relay C2, wire 3$a$ to controller M$y$ and resistance $r1$ to wire 3'. Potential relay P is differentially wound, a central point of its winding of equal potential to the center of the battery connecting to potential wire 1 by wire 1'. If there is an equal flow of current between relays C1 and C2, relay P will remain deënergized as these currents flowing in the opposite direction in this relay neutralize each other. These currents will be equal when the current in wires 2$a$ and 3$a$ are equal or balanced. Should these currents become unbalanced, as, for instance, with wire 3$a$ broken, then the circuit of relay C1 would be made through relay P, wire 1, and battery B1 to wire 2', thus energizing relay P while relay C2 remains deënergized. Relay P will also be energized if, instead of a break in wire 3$a$, the value of the resistance $r1$ is varied with relation to $r2$ or any other condition that will cause a difference in the drop of potential in the wires forming the current circuit. The unbalancing due to such a condition will tend to energize relay P which I prefer to make more sensitive than relays C1 and C2 so that when unbalancing exists this relay will respond to it before the latter. One of the features of my invention is the maintaining of a balance or debit relation of current between the control wires which corresponds to the conditions of safety. In another way, this may be regarded as a balance of potential between the battery and the point where the potential relay connects to the normally energized relays. These current and potential relays are used to control the circuit of a signaling device $f$, operated by the magnet D through the rod

*e*. At location Y this is energized from battery B2, wire 3", contact finger *c*1*a*, wire 11, contact finger *c*2*a*, wire 15, contact finger P*a* and wire 14 to magnet D and wire 1" to battery. The conditions are similar at location X except that energy is obtained from battery B1 and as switch M*x* is open, the current relays are open and the signaling device *f* is in the stop position.

Considering the operation of this arrangement: A ground or excessive leakage between wires 1 and 2 will cause a drop of potential in battery B1 thus unbalancing the circuit and enabling relay P to be enrgized from battery B2. Likewise the same conditions obtain between wires 1 and 3 if an excessive leakage takes place allowing relay P to energize from battery B1. If the transmission wires 2 and 3 are broken this will, of course, deënergize the local circuit. A cross or excessive leakage between wires 2*a* and 3*a* will tend to shunt out the current relays. A cross between wire 3*a* and 2 forms a shunt circuit on batteries B1 and B2 through resistance *r*1, thus drawing a heavy current through this resistance additional to the normal current for operating relay C2. This heavy current causes a greater drop in voltage through this resistance than is caused by the normal current through resistance *r*2 giving rise to the unbalancing desired. The same conditions applies to an excessive leakage between wires 2*a* and 3.

Consider now the effect of a cross between the wires for location X and those for location Y. In the first case, let the switches M*y* and M*x* be closed. If wires 2*a* at each location make cross connection, there will be no effect when the resistances *r*2 are equal in each circuit, but if these resistances are unequal there will be unbalancing. The same conditions apply to a cross between wires 3*a* of each circuit. If the cross occurs between wires of unlike polarity as 2*a* and 3*a*, this will put a shunt on the battery through resistance *r*1 and *r*2 and the increase of current so caused will cause a greater drop in these wires than in the other controlling wires, thus producing unbalancing. Assuming now that one of the switches is open as shown, and a cross occurs between wires 2*a*, then the current through resistance *r*2 will be feeding two circuits in multiple and will thus be greater than in *r*1, causing a correspondingly increased drop and effecting the unbalancing desired at Y, and energizing relay P at X. When wires 2*a* and 3*a* become crossed there will be an excessive current through resistance *r*1 feeding another circuit in multiple causing unbalancing and having the same effect as previously stated. Hence the tendency of any cross or ground is to cause unbalancing in the circuits affected which opens the remote controlled circuit. From this it will be seen that the purpose of the resistances *r*1 and *r*2 is to give characteristics to the controlling circuits of each controlled unit which will cause unbalancing in each circuit in case of any excessive leakage between controlling wires so as to open the remote controlled circuit.

Fig. 2 shows an application where individual energy is used for each location using a common neutral or potential wire. On this account the resistances shown in Fig. 1 may be omitted. The voltage of the batteries can be changed where it is desired to obtain the same effect as with an unequal resistance in each circuit with a central source of energy. The arrangement at location X is modified to the extent that energy is applied locally from the battery B3 for the operation of magnet D, through wires 12, contact finger, *c*1*a*, wire 11, contact finger *c*2*a*, wire 15, contact finger P*a*, wire 14, magnet D and wire 13 to other side of battery. Also it will be noted magnet P' is not differentially wound. In this case the batteries B1 and B2 are assumed to be of equal potential and relays C1 and C2 and wires 2*a* and 3*a* of equal resistance so that there is an equal drop between these wires and wire 2*b* forming the connection between the current relays, hence this point will be at equal potential with the middle point of the battery to which the potential wire 1 connects and which includes the relay P' normally deënergized. At location Y the application is shown to release a lock on the lever *g*. Here relay C consists of one magnet only to the central point of which the wire 2—3 connects and includes the circuit of relay P' with wire 1. Relay C is so adjusted that if the circuit of battery B1 only is made, it will not be powerful enough to lift armature; the same is also true of battery B2, both these batteries being required in series to pick up the armature which forms the lock. The potential and current relays are so arranged mechanically that unbalancing will prevent the lock from releasing. This is secured by an application of the walking beam principle in which the energizing of one relay will negative the effects from energizing the other. The armature *h* may be regarded as a walking beam pivoted at 1*h* and connecting to a tail on armature L, pivoted at 1L by the link K. When relay C is energized and P' deënergized, armature *h* is raised from slot in lever *g*, moving on pivot 1*k* in link K. If, when C is energized, P' also becomes energized attracting armature L, this raises link K moving pivot point 1*k* upward and lowering the opposite end of armature *h* on pivot 1*h* to engage the slot in lever *g* again the same as before relay C was energized.

In operation, a cross between wire 1 and 2*a* or 3*a* will cause a short circuit of one of the batteries and a corresponding unbalancing. With switches M*y* and M*x* closed a cross between wires of opposite polarity for different locations as 2a and 3a will cause a short circuiting of one side of each set of batteries thus unbalancing both circuits. Unbalancing will also take place by a cross between wires of the same polarity under these conditions if the batteries are of unequal voltage. With one of the switches open and the other closed either wire of the open circuit crossing with a wire of the closed circuit will energize relay P' of the open circuit and tend to unbalance the closed circuit by increasing the current and consequently the drop in one of the batteries.

In Fig. 3 a central source of alternating current is used from transformer T and transmission lines 6 and 7. This current is used at a different voltage for locations X and Y using a common potential wire 1. The arrangement at X and Y is similar to that at X, Fig. 2, the relays in this case being suitable for alternating current. The apparatus at Y is operated on a lower voltage by wires 4 and 5 than at location X and this circuit is controlled by relay My, which when deënergized, closes contacts ma and mb connecting wires 4a and 5a with wire 1''' thus short circuiting the potential and current relays.

r1 and r2 may be either resistances or reactances and are introduced for the purpose of giving a characteristic to each circuit, distinguishing them from other circuits operated from the same bus mains.

Fig. 4 is the preferred arrangement where an individual source of alternating current is used for each circuit. This arrangement includes a transmission line with transformers connected to it and the secondary side of these transformers forming a three wire circuit the neutral side of which is one side of the transmission line. This has the advantage that a break in the neutral wire 1—3 will also deënergize the transformers. Wires 2 and 1—3 are the transmission lines from transformer T feeding transformers T1 and T2, which, if desired, may step up the secondary circuit to a higher voltage. The middle point of the secondary of these transformers by means of wire 1a connects to wire 1—3. The arrangement at X and Y is similar to what has already been described except that the potential wire is superposed on one side on the transmission line as will be noted by relay P' connecting to wire 1—3 by wire 1'. This wire forms one side of two independent circuits, that is, it is common to the transmission line feeding transformers T1 and T2 and also to the superposed circuit operating relays P' from the secondary of these transformers. When the current in wires 2a and 3a is equal there will be no unbalancing to flow through relay P'. When, however, these currents are unequal the difference will find a circuit through relay P', wire i—3 and wire 1a to the intermediate tap on the secondary of the transformers T1 or T2, the conditions being similar to that described in connection with Fig. 2. In this illustration the energy for operating magnet D is obtained from the transmission line.

Attention is called to the fact that if the potential wire should become broken or disconnected from the source of energy, the current in the disconnected portion of this wire will find a return through the established circuits in multiple, for instance, if wire 1 becomes broken between locations X and Y, the unbalanced current in the outer portion will find return to battery on either wires 2a or 3a of the circuits established on this portion according to the direction of the unbalanced current, thus increasing the current in one side of the current circuit and producing unbalancing tending to energize the potential relays.

It will be noted that I have shown the various applications of my inventions in the simplest possible manner; in most cases illustrating each by a separate figure. In practice, however, it may be found desirable to combine several of the arrangements in one application which is the intent of this specification.

Having thus described my invention, what I desire to secure by Letters Patent is set forth in the following claims:—

1. In combination, a main circuit embodying a source of energy and electric translating means; and an auxiliary circuit incorporating said main circuit and another conductor and comprising an electric translating device, said translating device connected between an intermediate point in said source of energy and said electric translating means and wound with opposing coils to neutralize each other and forming part of said main circuit.

2. In combination, a main circuit embodying a source of energy and electric translating means, and an auxiliary circuit incorporating said main circuit and another conductor and comprising an electric translating device, said translating device connected between an intermediate point in said source of energy and said electric translating means and controlling an exterior circuit.

3. In combination, a main circuit embodying a source of energy and electric translating means, and an auxiliary circuit incorporating said main circuit and another conductor and comprising an electric translating device, said translating device connected between an intermediate point in said source of energy and said electric translating means and together with said electric translating means controlling a circuit.

4. In combination, a main circuit embodying a source of energy and electric translating means, and an auxiliary circuit incorporating said main circuit and another conductor and comprising an electric translating device, said translating device connected between an intermediate point in said source of energy and said electric translating means and when deënergized with said electric translating means energized, closing a circuit.

5. In combination, a main circuit embodying a source of energy and electric translating means, and an auxiliary circuit incorporating said main circuit and another conductor and comprising an electric translating device, said translating device connected between an intermediate point in said source of energy and said electric translating means and with said electric translating means controlling a circuit, the former when engaged interrupting the circuit established by the latter.

6. In combination, a main circuit embodying a source of energy and electric translating means, and an auxiliary circuit incorporating said main circuit and another conductor and comprising an electric translating device, said translating device being connected between intermediate points in said source of energy and said electric translating means, said circuits controlling an apparatus.

7. In combination, a main circuit embodying a source of energy and electric translating means, and an auxiliary circuit incorporating said main circuit and another conductor connected to an intermediate point in said source of energy and comprising an electric translating device, said electric translating means consisting of a plurality of electromagnets capable of independent operation, said electromagnets together with said electric translating device controlling a circuit.

8. In combination, a main circuit embodying a source of energy and electric translating means, and an auxiliary circuit incorporating said main circuit and another conductor connected to an intermediate point in said source of energy and comprising an electric translating device, said electric translating means consisting of a plurality of electromagnets capable of independent operation and controlling an apparatus.

9. In combination, a main circuit embodying a source of energy and electric translating means, and an auxiliary circuit incorporating said main circuit and another conductor and comprising an electric translating device, said electric translating means consisting of a plurality of electromagnets capable of independent operation, said electromagnets together with said electric translating device controlling a circuit, said translating device being capable of interrupting the circuit established by either of said electromagnets.

10. In combination, a plurality of main circuits embodying a source of energy and electric translating means, and auxiliary circuits incorporating said main circuits and another conductor connected to an intermediate point in said source of energy and each comprising an electric translating device, said conductor being common to all of said circuits.

11. In combination, a main circuit embodying a source of energy, resistance coils, and electric translating means, and an auxiliary circuit incorporating said main circuit and another conductor connected to an intermediate point in said source of energy and comprising an electric translating device, said main circuit being normally energized through said resistance coils.

12. In combination, a main circuit embodying a source of energy and electric translating means, an auxiliary circuit comprising an electric translating device connected between intermediate points in said source and said translating means, and a controlled apparatus operated by said translating device and said translating means, said auxiliary circuit being energized when the current in one side of said main circuit varies from a predetermined relation to the current in the other side.

13. In combination, a main circuit embodying a source of energy and electric translating means, and an auxiliary circuit incorporating said main circuit and another conductor and comprising an electric translating device, said translating device and said electric translating means operating an apparatus, said auxiliary circuit preventing said operation in event of excessive leakage in any of said circuits.

14. In combination, a main circuit embodying a source of energy and electric translating means, and an auxiliary circuit incorporating said main circuit and another conductor connected to an intermediate point in said source of energy and comprising an electric translating device, said translating means and said electric translating device operating an apparatus, with means including said translating device for rendering ineffective said operation due to energizing either said translating means or device when the other is energized.

15. In combination, a main circuit embodying a source of energy and electric translating means, an auxiliary circuit incorporating said main circuit and another conductor connected to an intermediate point in said source of energy and comprising a translating means, said first translating means and said latter translating means operating an apparatus, and means associated with said latter means for restoring equivalent conditions to said apparatus when both of said translating means are energized and when they are deënergized.

16. In combination, a main circuit embodying a source of energy and electric translating means, an auxiliary circuit incorporating said main circuit and another conductor connected to an intermediate point in said source of energy and comprising an electric translating device, said translating means and said electric translating device operating an apparatus, said auxiliary circuit rendering ineffective said operation due to energizing said main circuit when said auxiliary circuit is energized.

17. In combination, a main circuit embodying a source of energy and electric translating means, and an auxiliary circuit incorporating said main circuit and another conductor connected to an intermediate point in said source of energy and comprising an electric translating device, said translating means and said electric translating device controlling an apparatus, said auxiliary circuit energizing said translating device by the difference in current between the sides of said main circuit.

18. In combination, a main circuit embodying a source of energy and electric translating means, and an auxiliary circuit incorporating said main circuit and another conductor and comprising an electric translating device, said translating means and said electric translating device operating an apparatus, said auxiliary circuit rendering ineffective said operation due to energizing said main circuit when a leakage of current develops on either side of said main circuit.

19. In combination, a plurality of main circuits embodying a source of energy and electric translating means, and auxiliary circuits incorporating said main circuits and another conductor and each comprising an electric translating device, said translating means and translating device controlling an apparatus, said auxiliary circuits rendering ineffective the conditions due to energizing said main circuit when the first leakage develops between either side of its controlling wires and another circuit.

20. In combination, a main circuit embodying a source of energy and electric translating means, and an auxiliary circuit incorporating said main circuit and another conductor and comprising an electric translating device, said translating means and translating device operating an apparatus, said translating device rendering ineffective the conditions due to energizing said main circuit when a leakage of current occurs on its controlling wires and automatically restoring these conditions when said leakage is discontinued.

21. In combination, a plurality of main circuits embodying a source of energy and electric translating means, and auxiliary circuits incorporating said main circuits and another conductor, said conductor common to all of said auxiliary circuits connecting to an intermediate point in said source of energy, and forming a path for leakage that may develop on either side of said main circuits.

22. In combination, a plurality of main circuits embodying a source of energy and electric translating means, auxiliary circuits incorporating said main circuits and another conductor, said conductor common to all of said translating means and connecting to an intermediate point in said source of energy, said circuits controlling an apparatus, and said auxiliary circuits rendering ineffective the conditions due to energizing any of said main circuits in which said conductor is not at zero potential to said auxiliary circuits.

23. In combination, a main circuit embodying a source of energy and electric translating means, an auxiliary circuit incorporating said main circuit and another conductor, said conductor connecting to an intermediate point in said source of energy, said translating means operating an apparatus, and said auxiliary circuit rendering ineffective the conditions due to energizing said main circuit from one part of said source of energy only.

24. In combination, a main circuit embodying a source of energy and electric translating means, an auxiliary circuit incorporating said main circuit and another conductor and comprising an electric translating device, said conductor connecting to an intermediate point in said source of energy, said translating means and device operating an apparatus, said auxiliary circuit and said device rendering ineffective the conditions due to energizing said main circuit except when said source of energy on one side of said intermediate point bears a predetermined relation to the other side.

25. A system of operating electric circuits including, a plurality of main circuits embodying a source of energy and electric translating means, auxiliary circuits incorporating said main circuits and another conductor and each comprising an electric translating device, said translating devices connected in the return path of current in said conductor when it is disconnected from said source of energy.

26. A system of operating electric circuits including, a plurality of main circuits embodying a source of energy and electric translating means, auxiliary circuits incorporating said main circuits and another conductor and each comprising an electric translating device, the irregular operation of any of said main circuits due to leakage being confined to the circuits in which the leakage occurs.

27. A system of operating electric circuits including, a plurality of main circuits embodying a source of energy and electric translating devices, auxiliary circuits incorporating said main circuits and another conductor and each comprising an electric translating device, one or more of said auxiliary circuits being energized to render ineffective the energizing of said main circuits when a leakage develops between the conductors of any of said circuits.

28. A system of operating electric circuits including, a plurality of main circuits embodying a source of energy and electric translating devices, auxiliary circuits incorporating said main circuits and another conductor and each comprising an electric translating device, current of either positive or negative sign being established in the associated auxiliary circuit in which a leakage develops from or to any of the conductors of said main circuit.

29. In combination, a plurality of main circuits embodying a source of energy, resistance coils, and electric translating means, auxiliary circuits incorporating said main circuits and another conductor and each comprising an electric translating device, and means including said resistance coils for giving characteristics to each of said main circuits that will render ineffective the conditions due to energizing said translating means except when energized through their respective resistance coils.

In testimony whereof I have affixed my signature in presence of two witnesses.

MATTHEW H. LOUGHRIDGE.

Witnesses:
W. J. ECCLES,
TILLIE E. LOUGHRIDGE.

---

It is hereby certified that in Letters Patent No. 1,197,379, granted September 5, 1916, upon the application of Matthew H. Loughridge, of Woodcliff-on-Hudson, New Jersey, for an improvement in "Operating Electric Circuits," an error appears in the printed specification requiring correction as follows: Page 1, line 103, for the word "debit" read *definite;* and that the said Letters Patent should be read with this correction therein that the same may conform to the record of the case in the Patent Office.

Signed and sealed this 21st day of November, A. D., 1916.

[SEAL.]

F. W. H. CLAY,
*Acting Commissioner of Patents.*

Cl. 177—339.